Aug. 15, 1967  N. HILDRETH  3,335,892

FOAM PLASTIC CAP

Filed May 25, 1966

NELSON HILDRETH
*INVENTOR.*

BY

*Ernest J. Peterson*

AGENT

United States Patent Office 3,335,892
Patented Aug. 15, 1967

3,335,892
FOAM PLASTIC CAP
Nelson Hildreth, Wilmington, Del., assignor, by mesne assignments, to Hercules Incorporated, New Castle County, Del., a corporation of Delaware
Filed May 25, 1966, Ser. No. 552,845
10 Claims. (Cl. 215—41)

The present invention relates to a closure for a container and has for its objects to provide an attractive closure of thermoplastic material, especially foamed thermoplastic material, which closure will provide an effectively air-tight seal for the container and which is also easy to use and reasonably economical as well as provides a thermal insulation and cushioning for the container.

The above objects have been attained in accordance with this invention by a closure formed from two sheets of a foamed thermoplastic material, such as a foamed polystyrene, which are sealed together at the periphery of the cap and have a layer of air entrapped between the same.

With the above and other objects in view, the present invention is herein described with reference to the accompanying drawing, in which.

Figure 1:
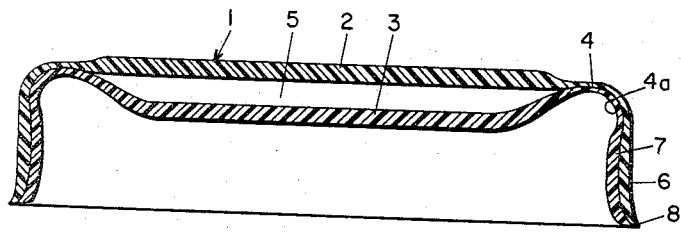
FIG. 1 is a transverse sectional view of a closure embodying the present invention.

With reference to the drawing, there is illustrated in FIG. 1 a closure 1 having a circular central portion comprising a top or outer wall 2 and a bottom or inner wall 3. The walls 2 and 3 are formed from separate and distinct sheets of material heat sealed together about the periphery thereof at the seal 4 with a volume of air trapped in the space or air pocket 5 between them. Integral with each of the walls are depending side flanges 6 and 7, respectively, that are disposed substantially normal to the walls 2 and 3. The free ends 8 of the side flanges 6 and 7 are also heat sealed together, while the opposite ends of the side flanges adjacent to the periphery of the walls 2 and 3 are formed with an undercut 4a.

Figure 3:
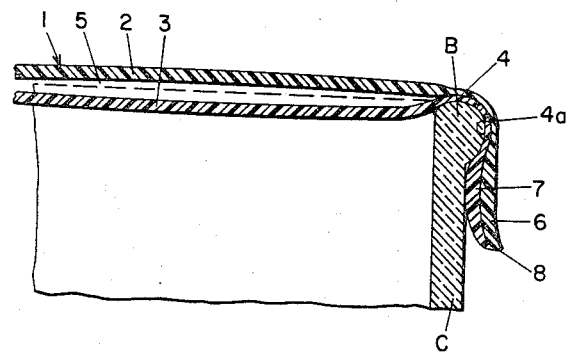
FIG. 3 is a fragmentary sectional view of the closure of FIG. 1 mounted on a container.

For forming the closure 1 there is provided a mold M including an upper or female mold member 9 and a lower or male mold member 10. The upper mold member 9 is formed with a cavity 11 which is adapted to receive in molding relation the plug 12 of the lower mold member 10, which cavity is defined by a bottom wall 13 and a side wall 14. The plug 12 has a top wall 15 and a side wall 16 that, when the mold M is closed, are opposed respectively to the walls 13 and 14 of the cavity 11. At the juncture of the walls 15 and 16, the plug 12 is provided with a bead 17 extending about the periphery of the top wall 15 and beyond the surfaces defined by both of the walls 15 and 16 so that when the molds are closed, the bead 17 extends into the corner of the mold member 9 that is formed by the intersection of the walls 13 and 14. The bead 17 extends significantly beyond the top wall 15 so that when the mold is closed and the extremity of the bead 17 is forced against the opposed portion of the bottom wall 13 of the mold member 9 to compress the sheets S between them, the top wall 15 and the bottom wall 13 are spaced more than the combined thicknesses of the sheets S to accommodate the pocket 5 between the sheets S. The spacing between the side walls 14 and 16 is substantially equal to the combined thicknesses of the sheets S. The projection of the bead 17 laterally from the side wall 16, is, for example, about equal to the thickness of one of the sheets S so that the material at this point is compressed to form an undercut 4a which is adapted to receive the bead B at the top of a container C, as illustrated in FIG. 3. The lower mold member 10 may also be provided with a shoulder 18 that overlaps slightly with and is opposed to the end face 19 of the upper mold member 9. Outwardly of the shoulder 18 the mold member 10 has a cut-away 20 to provide clearance for the edge portion of the two sheets S of the material from which the closure is formed.

Figure 2:
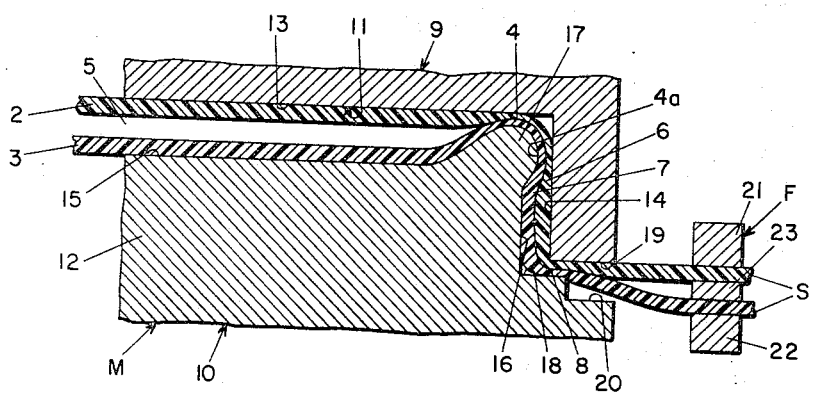
FIG. 2 is a fragmentary sectional view of the mold and the material during the formation of the closure of FIG. 1.

In forming the closure 1, the two sheets S are clamped in spaced parallel relation, for example, in a supporting frame for preventing contraction and for facilitating handling thereof, such as the frame F that is illustrated schematically in FIG. 2. The frame F includes an upper and lower clamping jaws 21 and 22, respectively, and an intermediate spacer element 23. With the sheets S thus clamped, they are heated as by placing the frame F in an oven to a forming temperature which, for foamed polystyrene would be in the range of 210° F. to 350° F. and preferably about 300° F. When the sheets S are heated to the desired temperature, the frame F is removed from the oven and introduced to the mold M which is then closed. Because of the bead 17, air is trapped between the sheets S which, by virtue of the fact that the sheets S are at forming temperature and are forced together under pressure between the uppermost edge of the bead 17 and the opposed portion of the top wall 13 of the cavity 11, are sealed together at the periphery thereof to form the seal 4. Because of the elevation of the uppermost edge of the bead 17, sufficient space is provided between the bottom wall 13 of the cavity 11 and the top wall 15 of the plug 12 to accommodate the combined thicknesses of the sheets S, as well as the desired depth of the pocket 5. At the same time, the lateral projection of the outermost edge of the bead 17 cooperates with the side wall 14 of the upper mold member 9 to prevent the escape of the air trapped in the pocket 5 and also compresses the sheets S against the side wall 14 to form the undercut 4a. The sheets S are also forced together under pressure at the shoulder 18 to form the seal 8 at the bottom edges of the side flanges 6 and 7 of the closure 1.

After the sheets S have cooled and set in the formed condition, the molds 9 and 10 are separated and the formed sheets are removed. The final step in making the closure 1 is to sever the same from the sheets S about the free edge of the side flanges 6 and 7 and with a portion of the seal 8 remaining on the closure 1 for sealing the edges of the flanges 6 and 7 and thereby enhancing the appearance of the completed closure. The closure 1 may be severed from the sheets S, for example, by punching with appropriate dies.

As an example of a specific method of making closures in accordance with this invention, two sheets of foamed polystyrene, having a density of about five pounds per cubic foot and a thickness of sixty to seventy mils, were clamped in a frame with a gap of one-fourth of an inch between the same. The sheets in the frame were placed for forty-five seconds in an oven that was heated by circulated air at a temperature of 300° F. After heating, the sheets were placed between the mold members 9 and 10, which were closed rapidly. The molds remained closed for a period of 5 seconds to allow the sheets S to cool and set, after which they were opened and the formed sheets S were removed and the closure 1 trimmed therefrom.

With a closure formed in accordance with the above example, the seal 4 is relatively weak because of the low forming temperature employed. However, because of the mating or mechanical interlocking of the formed sheets at the side flanges 6 and 7, and particularly at the undercut 4a, there is substantially no force exerted on the seal 4 to break it. The primary purpose of the seal 4, therefore, is to provide an air-tight seal about the pocket 5, and it has been found that the seal 4 formed as indicated above is adequate. The seal 4 is, of course, assisted in preventing the escape of air from and thus the collapse of the pocket 5 by the intimate contact of the two sheets through the undercut 4a and the side flanges 6 and 7, the pressure of which contact is increased by any tendency of the innermost side flange 7 to return to its initial position, that is, to sheet form, which would cause it to expand outwardly against the flange 6. The seal 8, while primarily designed to secure the free edges of the side flanges 6 and 7 together for appearances, also helps to effect the desired sealing of the air pocket 5. Because of the seal 8 and the mechanical interlocking of the two sheets at the undercut 4a and in the flanges 6 and 7, the seal 4 need not be as strong as would otherwise be required, thus permitting a lower forming temperature. The advantage of using a relatively low forming temperature is that it permits more rapid cooling to setting temperature and thus a more rapid forming cycle, while at the same time effecting a minimum heating of the mold.

The material from which the closure 1 is formed may be any suitable thermoplastic material which is heat-sealable at its forming temperature to a degree sufficient to form an airtight seal 4 and is otherwise capable of maintaining the air sealed in the pocket 5. Because it is relatively inexpensive and easy to form and also because of its texture and appearance, a preferred material is foamed polystyrene having a density that is as low as possible and preferably about three pounds per cubic foot and not more than about ten pounds per cubic foot. It will, of course, however, be apparent that other suitable materials are available and may be used, particularly copolymers of polystyrene. Dissimilar materials or laminated materials may also be used, for example, the outer wall 2 may be formed of foamed polystyrene having the desired softness in its feel and appearance and having the desired insulation and cushioning properties, while the inner wall 3 may be formed of a compatible material from the standpoint of heat sealability but which may be more inert or less permeable to the contents of the container upon which it is to be used.

One of the properties of closures in accordance with this invention is that it affords excellent thermal insulation. In addition to the insulation provided by the two thicknesses of the material from which the closure is formed, the air trapped in the pocket 5 also provides significant insulation. The closure 1 is thus adapted for use in applications requiring thermal insulation, for example, for containers for either hot or cold liquids or other substances. Because the closure is also very inexpensive, it is adapted for throw-away use such as with containers for dispensers for hot beverages, or with ice cream cups.

A further significant feature of the closures in accordance with this invention is in the texture or the feel and the appearance thereof. A closure formed from a material such as foamed polystyrene has a very soft and pleasing feel as well as an attractive appearance, which adapts the same for use as a cover, for example, for cosmetic packages. In addition to enhancing the attractiveness of such a package, the present closure also has the advantage that the high energy absorption properties thereof afford significant protection against damage for the package and for the contents in the event, for example, that it is accidentally dropped. This is particularly advantageous with glass containers that are used, for example as a cosmetic package. The closure may also be used with containers for fragile items, for example, as an attractive shipping container for a perfume bottle or dispenser or other delicate glass or ceramic articles.

With a double-walled closure as herein contemplated, the softness and flexibility thereof also affords an effective air-tight seal with a container with less pressure than would otherwise be required because of the gasket-like effect of the inner wall 3. Thus, the closure is adapted to be made from materials that offer advantages in its thermal insulation properties and appearance, but which would otherwise be unusable because it is too soft to develop sufficient sealing pressure to maintain an air-tight seal.

In addition to the thermal insulation qualities and appearance of foam, a further advantage of using foam is that it has the necessary rigidity with a minimum of material, and at the seals 4 and 8, with the foam collapsed and sealed, provides sufficient strength to grip the bead B of the container C, while affording flexibility so that the closure can be repeatedly snapped onto and removed from the container.

What I claim and desire to protect by Letters Patent is:

1. A closure comprising a central portion and a side flange extending in one direction from the periphery of said central portion, said side flange having means for releasably securing the closure to an opening of a container, and said central portion comprising two walls including an outer wall and an inner wall that are secured together at their periphery and are spaced apart by a pocket of air trapped between the same, said closure being formed of two separate thermoplastic materials of which at least the one forming said outer wall is of foamed thermoplastic material.

2. A closure in accordance with claim 1 in which said sheets are heat-sealed together at the free end of said side flange.

3. A closure in accordance with claim 1 in which both of said walls are formed of a foamed thermoplastic material.

4. A closure in accordance with claim 1 in which both of said walls are formed of foamed polystyrene.

5. A closure in accordance with claim 4 in which the foamed polystyrene has a density substantially in the range of three to ten pounds per cubic foot.

6. A method of making a closure comprising the steps of assemblying two sheets of a thermoplastic material substantially in spaced parallel relation in a supporting frame, heating said sheets to forming temperature, introducing said sheets into a mold that is adapted when closed to form in said sheets a closure having a central portion and a side flange extending in one direction from the periphery of said central portion and with said mold forcing said sheets together under pressure about the periphery of said central portion while providing for said central portion of said sheets internally of the periphery to be disposed in spaced parallel relation and with said mold forming an undercut in said flange adjacent to the periphery of said central portion, closing said molds to trap air between said sheets and within the periphery thereof, allowing said sheets to cool and set within said mold, and opening said mold and removing said sheets with the closure formed therein.

7. A method in accordance with claim 6 in which said thermoplastic material comprises foamed polystyrene.

8. A method in accordance with claim 7 in which said forming temperature to which said foamed polystyrene is heated is about 300° F.

9. A method in accordance with claim 6 in which the mold is adapted to force said sheets together under pressure at the free end of said side flange.

10. A method in accordance with claim 9 in which, after the sheets are removed from the mold, the closure is severed from said sheets along a line at the free end of said side flange.

References Cited
UNITED STATES PATENTS 3,281,000  10/1966  Lowen _____ 215—41

FOREIGN PATENTS 895,512  5/1962  Great Britain.

FRANKLIN T. GARRETT, *Primary Examiner.*